No. 648,426. Patented May 1, 1900.
E. OLUND & P. J. CAESAR.
WHEEL.
(Application filed Apr. 4, 1898. Renewed Oct. 2, 1899.)
(No Model.) 2 Sheets—Sheet 2.
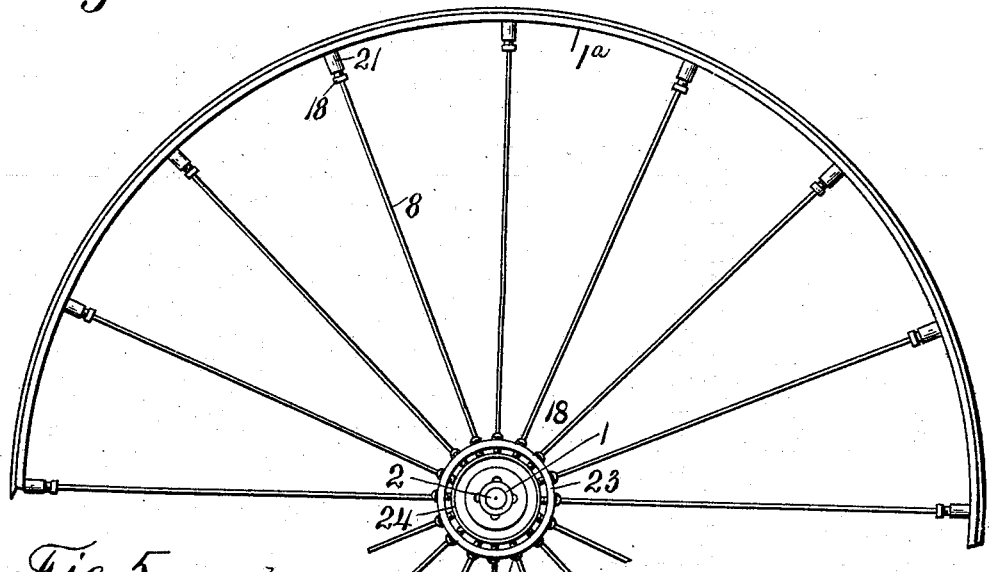
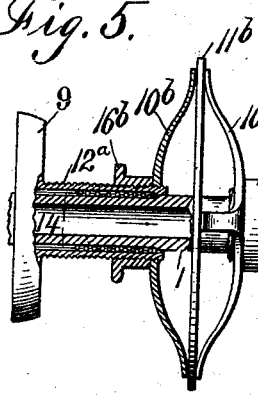
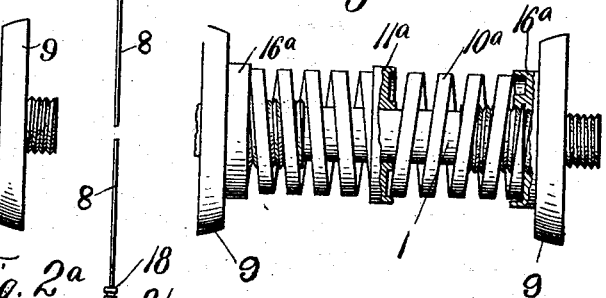
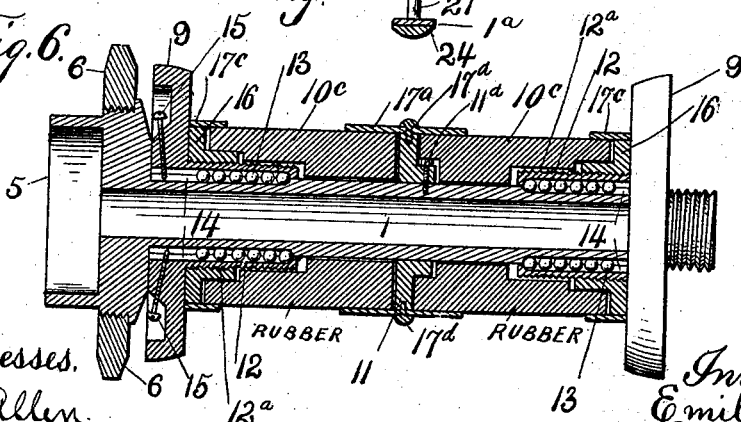
Witnesses.
W. E. Allen
E. K. Allen
Inventors.
Emil Olund.
Peter J. Caesar.
By Knight Bros.
Attys.

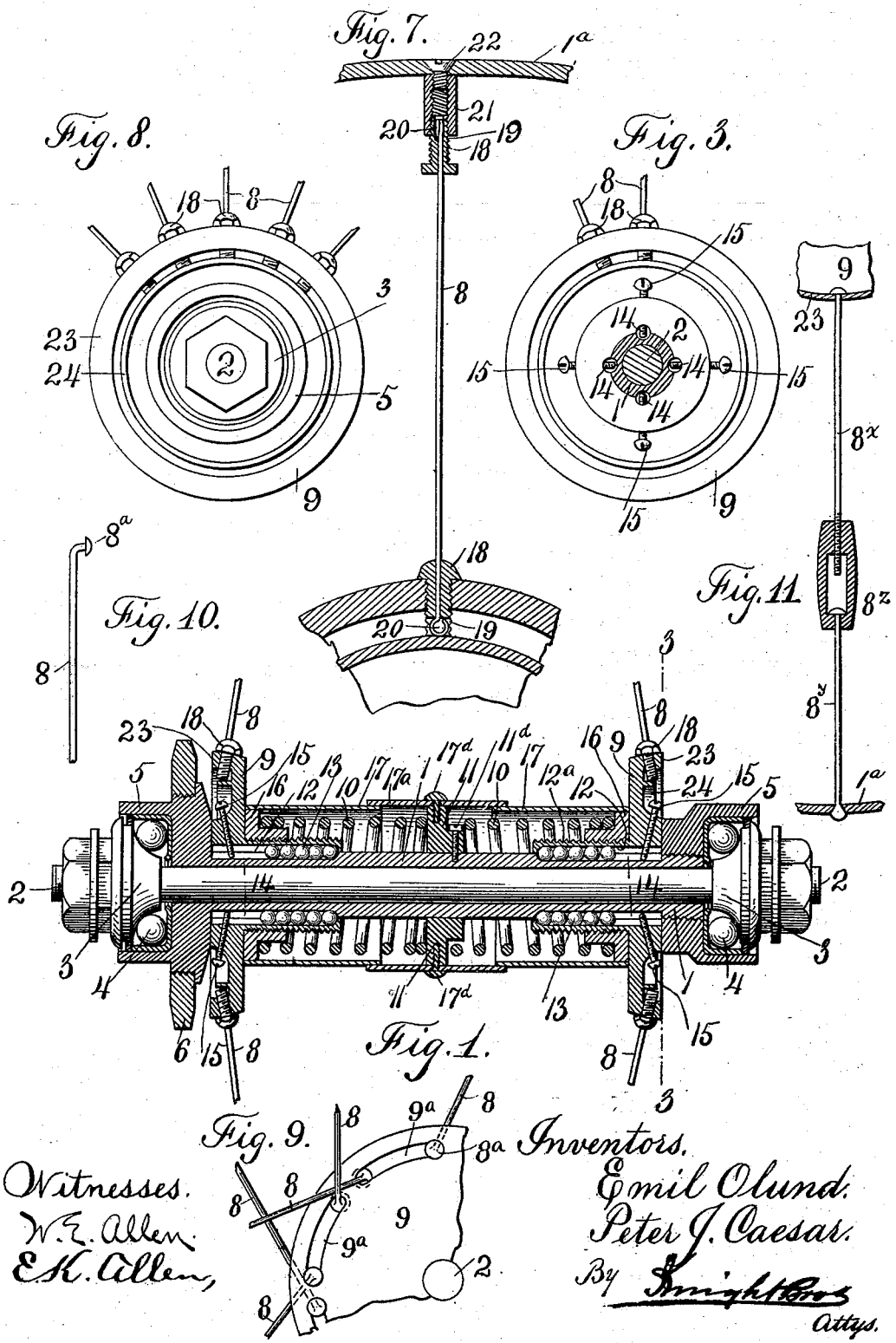

UNITED STATES PATENT OFFICE.

EMIL OLUND AND PETER J. CAESAR, OF DULUTH, MINNESOTA; SAID CAESAR ASSIGNOR TO SAID OLUND AND JOHN CAESAR.

WHEEL.

SPECIFICATION forming part of Letters Patent No. 648,426, dated May 1, 1900.

Application filed April 4, 1898. Renewed October 2, 1899. Serial No. 732,407. (No model.)

*To all whom it may concern:*

Be it known that we, EMIL OLUND and PETER J. CAESAR, citizens of the United States, and residents of Duluth, in the county of St. Louis and State of Minnesota, have invented certain new and useful Improvements in Wheels, of which the following is a full, clear, and exact specification.

Our invention relates to wheels of the type employing tension-spokes suitably secured to a flexible rim and extending alternately to opposite ends of the hub, so as to form a self-sustaining structure in a manner well known in the art.

The object of our invention is to construct such a wheel in such a manner that it will have a requisite amount of resiliency between the axle and the rim to take up shocks and afford all the ease of riding which is generally obtainable from pneumatic tires or other forms of expensive cushioning devices applied to the rim of the wheel.

We accomplish the object of our invention by arranging the parts at the ends of the hub to which the spokes are attached so that said parts, while normally spread apart with sufficient force to maintain a substantial structure, will be held in such position by means which yields under the stress of a load imposed upon a wheel. Since the spokes are normally inclined away from the plane of the rim, it follows that the yielding of the connection between the spokes and the hub in an axial direction affords such a yielding or resilient action between the axle upon which the load is imposed and the rim by which the load is supported that a complete absorption of shocks will result and as great if not greater ease of riding obtained as is obtainable from any of the well-known forms of cushioning devices.

Our improvements consist in the novel features of construction as hereinafter described and claimed.

In order that our invention may be fully understood, we will proceed to describe it with reference to the accompanying drawings, in which—

Figure 1 is an axial section of a hub in which are embodied by a preferred construction the features of our present invention. Fig. 2 is a side view of a wheel, partly broken away, embodying the same construction as illustrated in Fig. 1. Fig. 2ª is a fragmentary view thereof, illustrating by transverse section a preferred form of tire. Fig. 3 is a transverse section on the line 3 3, Fig. 1, looking inwardly. Fig. 4 is a side elevation, partly in section, representing a modified construction of hub embodying the principle of spoke attachment yielding inwardly and axially on the hub. Fig. 5 is a side elevation, partly in section, representing another modified construction. Fig. 6 is an axial section representing still another modified construction. Fig. 7 is a detail vertical section illustrative of means for securing the ends of spokes to the rim and to the hub attachments. Fig. 8 is a detail end elevation of the hub part of the same. Fig. 9 is a fragmentary view of a hub-flange and of a spoke having yielding connection with said flange. Fig. 10 is a view of the outer end of one of the spokes. Fig. 11 is a detail view showing another form of yielding spoke in which a turnbuckle is employed.

1 represents the hub of the wheel, which for purposes of illustration is here represented as a common form of bicycle-hub provided with an axle 2 and turning bearings consisting of the cone 3, balls 4, and box 5. 6 represents a driving sprocket-wheel secured to one of the boxes. These parts, however, bear no special relation to our present invention, and they may be replaced by other equivalent parts, as may be dictated by choice or purposes for which the wheel is to be employed.

8 represents tension-spokes which form a connection between the flexible or yielding rim 1ª and the hub. Since the load supported by the rim through the medium of the hub imposes tension on the upper spokes of these spokes and since they extend outwardly from the vertical plane of the rim toward the opposite ends of the hub, it follows that if the inner ends of the spokes connected to the respective ends of the hub are allowed to approach the vertical plane of the rim under a load the lower spokes will thereby be permitted to yield and a resilient connection between the lower part of the rim and the hub, available uniformly at every point on the periphery of the wheel as the wheel turns, will be obtained. To provide for this inward axial yielding of the spoke connection at the hub, the attaching-flanges 9 are mounted movably upon the hub and kept normally spread apart by yielding force. We prefer to employ as the yielding spacing medium a spring or springs 10, surrounding the hub and preferably divided by a central disk 11 and bearing at their outer ends against the flanges 9. The disk 11 is secured fixedly by a screw $11^d$. To cause the flanges 9 to work easily upon the hub 1, they are preferably provided with inwardly-extending sleeves 12, which afford an elongated bearing between the flange and the hub and permit the introduction of sliding ball-bearings 13 between the relatively-moving parts. We prefer to employ four sets of balls 13 at each end of the hub, as will be understood upon reference to Figs. 1 and 6, and to mount these balls in grooves 14, formed between the flanges 9 or their sleeves 12 and the axle-box 1, upon which said parts slide. By thus interposing the balls we accomplish the important additional result of keying the flanges against rotary movement upon the hub. The ends of the grooves 14 may be closed against the escape of the balls by radially-inserted screws 15 or by other suitable means.

16 represents internally-threaded adjusting-nuts fitting upon the exterior threads $12^a$ of the sleeves 12, by means of which the tension put upon the springs 10 may be regulated at will.

17 $17^a$ represent a telescoping sheathing surrounding the working parts of the collapsible hub, of which the central section $17^a$ may be held in place upon the disk 11 by screws $17^d$.

By referring to Figs. 4, 5, and 6 it will be observed that other forms of expanding means may be employed for keeping the hub normally extended while yielding to permit collapse under stress of a load imposed upon a wheel. For instance, as shown in Fig. 4, a flat spiral spring or springs $10^a$ may be employed in connection with adjusting-nuts $16^a$ and intermediate stop or disk $11^a$, said nuts and disk being provided with annular depressions to receive the abutting ends of the springs; or, as shown in Fig. 5, a dished or flat form of spring $10^b$, made up of a number of curved radial arms, may be employed on opposite sides of a disk $11^b$ and having abutment against the respective sleeves 12 of the hub-flanges 9 through the medium of adjusting-nuts $16^b$; or, as shown in Fig. 6, rubber or other cushions $10^c$ may be introduced as the expanding medium, the functions performed being the same as described with reference to Figs. 1, 4, and 5, the inclosing sheathing $17^a$ $17^c$ being employed for confining the cushion near its ends.

From the foregoing description it will be observed that we have provided by several practical embodiments and in combination with the rim and spreading tension-spokes an axially-collapsing hub having means for holding it normally distended with a yielding force. It will of course be understood that this yielding force is commensurate with the load which the wheel is intended to support, so as to obtain the necessary resiliency to afford ease of riding and absorption of shocks, but at the same time to sustain the wheel in its proper shape. We prefer to employ in connection with the yielding feature of the wheel a special means for attachment of the spokes to the rim and to the hub. This means consists, primarily, of tubular screws 18, having in their ends transverse slots 19, so that the spoke 8 may be introduced in the bore of the screw and then formed with an eye or other form of enlargement 20 in the slot 19 to prevent withdrawal of the spoke from the screw. For securing the spoke to the rim we provide an internally-threaded sleeve 21, which is secured at one end to the rim by a screw 22 and receives at its inner end one of the screws 18. By turning the screw 18 into the sleeve 21 the spoke 8 may be tightened at will. For attachment of the spoke to the flange 9 said flange is provided with a series of perforations in its rim 23, which receive the screws 18, while just within the rim 23 is an annular stop 24, against which the screws 18 may impinge, so as to prevent inward movement of the spoke-head 20 when the spoke is relaxed by the axial collapsing of the hub. One or other of the heads 20 in the screws 18 is made of such shape that the spoke may turn in the screw and avoid twisting the spoke in tightening it. The slot 19 in the screw 18 is therefore simply representative of an enlargement which will receive the head of the spoke and need not be of any particular shape.

The rim may be provided with a rubber shoe or tire 24, as shown in Fig. $2^a$, to prevent slipping.

If it is desired to use a spoke too heavy to bend under the yielding rim, the spokes may be made to yield longitudinally under compression, while still offering a rigid support under tension in some suitable manner—such, for instance, as illustrated in Figs. 9, 10, and 11, wherein 9 represents the hub-flange, which may be provided with slots $9^a$, in which the spokes are secured by angularly-presented heads $8^a$ in such a manner that the heads will engage in the ends of said slots under tension and afford the necessary rigid support, but will yield in said slots under compression and permit freedom of the yielding effect, which it is the main object of our invention to obtain. The same result is obtained by the means illustrated in Fig. 11, where the spoke is divided into two parts $8^x$ $8^y$, connected by a turnbuckle $8^z$, in which one of the spoke-sections is screwed, while the other is headed, so as to yield longitudinally under compression of the spoke, but offer rigid support under tension, or it is obvious from an inspection of Fig. 7 that the necessary yielding effect might be obtained by allowing ample room in the sleeve 21 for movement of the head 20, formed on the spoke 8.

Having thus described our invention, the following is what we claim as new therein and desire to secure by Letters Patent:

1. In a wheel, a flexible rim and the described means for attaching spokes to the hub, consisting of the hub-flanges having an inward axial movement, balls interposed in axial grooves formed between the hub-flanges and hub, and means for holding the hub-flanges outward with a yielding pressure, substantially as and for the purpose set forth.

2. In a wheel, the combination of the rim, the spreading spokes, the hub, the hub-flanges axially movable upon the hub and provided with inwardly-projecting sleeves, the resilient medium for holding the hub-flanges outward, and the adjusting-nuts threaded upon the sleeves of the hub-flanges and affording the abutment for the resilient medium, substantially as and for the purposes set forth.

3. In a wheel, the combination of the hub-flange 9 having a perforated rim and an abutment 24 within said rim, the spokes 8 and the screws 18 through which the spokes are passed, provided with slots 19 in which the spokes are headed and impinging against the abutment 24 to prevent displacement of the spokes, substantially as and for the purposes set forth.

4. A wheel comprising an axle-box or hub, formed with roller-grooves, a flexible rim, flanges having inwardly-extending sleeves formed with roller-grooves, rollers in said grooves, means for holding the flanges outward with yielding pressure, the telescoping sheathing, and the spokes rigid under tension and yielding under compression; substantially as described.

EMIL OLUND.
PETER J. CAESAR.

Witnesses:
A. L. HUDSON,
E. M. BARKER.